United States Patent
Hwang et al.

(10) Patent No.: US 8,981,026 B2
(45) Date of Patent: Mar. 17, 2015

(54) CYCLOOLEFIN POLYMER COMPOUND AND METHOD OF PREPARING THE SAME

(75) Inventors: Woon Sung Hwang, Gimpso-si (KR); Jong Un Sung, Gyeyang-gu (KR); Woon Jin Park, Changwon-si (KR); Sung Rak Joo, Seo-gu (KR); Bun Yeoul Lee, Suwon-si (KR); Eun Seok Park, Suwon-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 0 days.

(21) Appl. No.: 14/237,077

(22) PCT Filed: Aug. 6, 2012

(86) PCT No.: PCT/KR2012/006230
§ 371 (c)(1),
(2), (4) Date: Jun. 19, 2014

(87) PCT Pub. No.: WO2013/022242
PCT Pub. Date: Feb. 14, 2013

(65) Prior Publication Data
US 2014/0296436 A1 Oct. 2, 2014

(30) Foreign Application Priority Data
Aug. 5, 2011 (KR) .................. 10-2011-0077973

(51) Int. Cl.
*C08G 61/08* (2006.01)
*C08F 8/04* (2006.01)
*C08F 4/623* (2006.01)
*C08F 4/69* (2006.01)
*C08F 36/02* (2006.01)
*C07F 11/00* (2006.01)
*C08F 232/08* (2006.01)

(52) U.S. Cl.
CPC ............... *C08F 232/08* (2013.01); *C08F 36/02* (2013.01); *C08F 4/623* (2013.01); *C08G 61/08* (2013.01); *C08G 2261/3325* (2013.01); *C08G 2261/418* (2013.01); *C08G 2261/724* (2013.01); *Y10S 525/94* (2013.01)
USPC .......... 526/283; 526/76; 526/161; 525/332.1; 525/338; 525/339; 525/940

(58) Field of Classification Search
USPC ......... 526/161, 283, 76; 525/332.1, 338, 339, 525/940
See application file for complete search history.

(56) References Cited

U.S. PATENT DOCUMENTS 5,202,388 A * 4/1993 Iio et al. ......................... 525/338
5,705,572 A * 1/1998 Yi et al. ......................... 525/339

FOREIGN PATENT DOCUMENTS

EP 0324965 A2 * 7/1989

* cited by examiner

*Primary Examiner* — Fred M Teskin
(74) *Attorney, Agent, or Firm* — Sughrue Mion, PLLC

(57) ABSTRACT

This invention relates to a cycloolefin copolymer, which is prepared via ring-opening metathesis polymerization using, as monomers, dicyclopentadiene obtained by chemically bonding two cyclopentadiene molecules using a Diels-Alder reaction and tricyclopentadiene obtained by chemically bonding three cyclopentadiene molecules using a Diels-Alder reaction, in which the cyclopentadiene is a C5-fraction of naphtha cracking, and to a method of preparing the same. This copolymer is a non-crystalline transparent resin and is useful for a variety of end uses.

10 Claims, 1 Drawing Sheet

CYCLOOLEFIN POLYMER COMPOUND AND METHOD OF PREPARING THE SAME

TECHNICAL FIELD

The present invention relates to a cycloolefin polymer (COP) compound and a method of preparing the same, and, more particularly, to a cycloolefin copolymer, which is prepared via ring-opening metathesis polymerization (ROMP) using, as monomers, dicyclopentadiene obtained by chemically bonding two cyclopentadiene molecules using a Diels-Alder reaction and tricyclopentadiene obtained by chemically bonding three cyclopentadiene molecules using a Diels-Alder reaction, in which the cyclopentadiene represents a large portion of the C5 fractions of naphtha cracking.

BACKGROUND ART

Among products of naphtha cracking, fractions having 4 or less carbons are separated and purified and thus utilized in the petrochemical industry, but C5-fractions having 5 carbons are mostly combusted and used as fuel and only a portion thereof is separated and purified by some companies and thus utilized industrially. Thus, a lot of effort has been devoted to manufacturing high value-added chemical products by separating and purifying C5-fractions.

For example, a norbornene monomer may be prepared into a resin using ROMP and then hydrogenation, as represented by Scheme 1 below (Masahiro Yamazaki, *Journal of Molecular Catalysis A: Chemical* 213 (2004) 81-87). The polymer thus obtained is referred to as a cycloolefin polymer (COP), which is advantageous in terms of high transparency and low birefringence and thus utilized in materials for packaging food and medicines, DVD materials, optical films for displays, etc.

[Scheme 1]

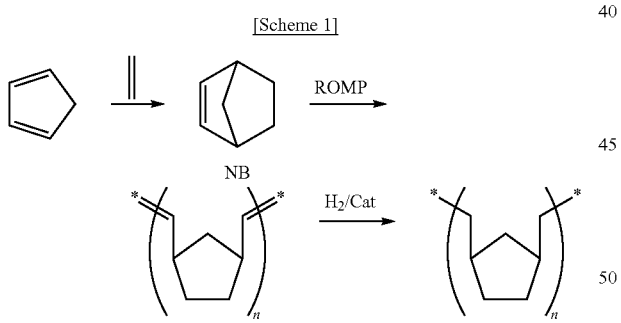

Alternatively, many attempts have been made to produce resins resulting from ROMP and hydrogenation of a bulky cycloolefin compound monomer such as 1,4,5,8-dimethano-1,2,3,4,4a,5,8,8a-octahydronaphtalene (hereinafter, abbreviated to "DMON") obtained by subjecting norbornene to an additional Diels-Alder reaction with cyclopentadiene (Masahiro Yamazaki, *Journal of Molecular Catalysis A: Chemical* 213 (2004) 81-87). However, as shown in Scheme 2 below, DMON is prepared via two steps from dicyclopentadiene and its preparation process is not easy and it is undesirably very expensive to the extent that it is unsuitable for use as a polymerizable monomer. Hence, the monetarily beneficial preparation of DMON is currently regarded as important in terms of commercialization of resins based on DMON.

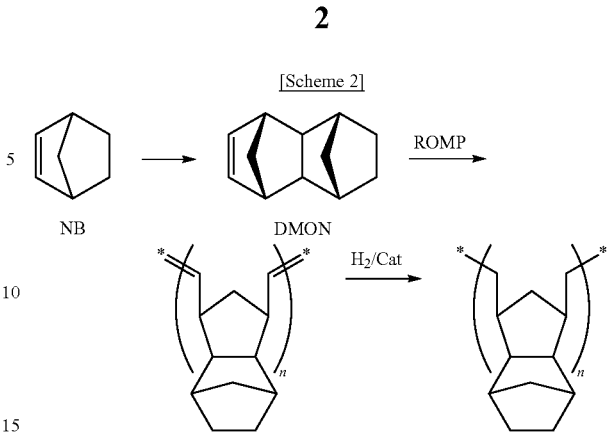

The polymer material of Scheme 2 has been commercialized by Zeon Corp., Japan.

Zeon Corp., Japan, has produced resins by performing, as shown in Scheme 3 below, ROMP of the olefin group of carbons at 5-6 positions of dicyclopentadiene to prepare a linear polymer, which is then hydrogenated (Masahiro Yamazaki, *Journal of Molecular Catalysis A: Chemical* 213 (2004) 81-87). In this case, it is essential to completely remove the double bonds of the resin using hydrogenation. However, the resulting resin is problematic because the glass transition temperature is not high.

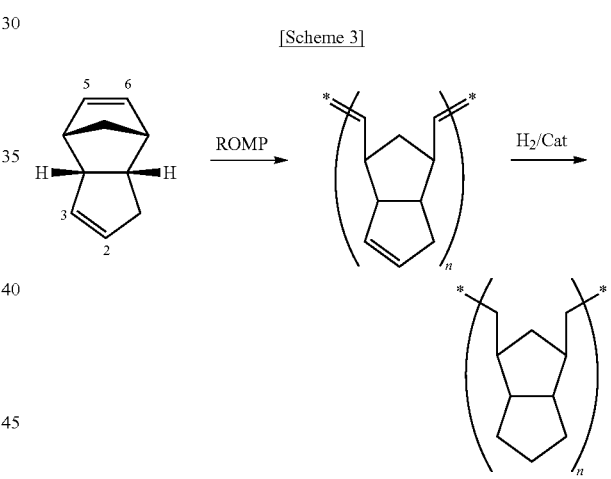

DISCLOSURE

Technical Problem

Accordingly, the present invention is intended to provide a COP compound, which may utilize a monomer that is easy to obtain and can be used to solve problems of the low glass transition temperature of conventional COP compounds prepared from dicyclopentadiene alone.

Also the present invention is intended to provide a method of preparing a COP compound via ROMP using a monomer easy to obtain.

Also the present invention is intended to provide a method of hydrogenating double bonds of a main chain and a ring moiety of the COP compound obtained using ROMP.

In particular an embodiment of the present invention is intended to provide a COP compound having a high glass transition temperature.

Technical Solution

An embodiment of the present invention provides a COP compound having a repeating unit represented by Chemical Formula 1 below.

[Chemical Formula 1]

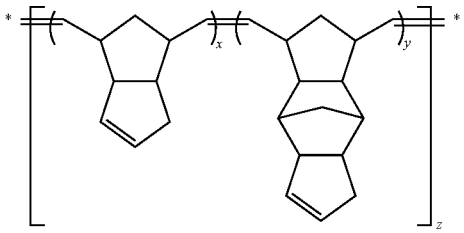

wherein a molar ratio of x:y is 99:1~1:99, and z has an average value of 10~20,000.

A preferred embodiment of the invention provides a COP compound having a repeating unit represented by Chemical Formula 1 in which the molar ratio of x:y is 90:10~50:50 and z has an average value of 10~3,000.

In addition, an embodiment of the present invention provide a method of preparing the COP compound having the repeating unit represented by Chemical Formula 1 by polymerizing a compound represented by Chemical Formula 2 below, dicyclopentadiene and a compound represented by Chemical Formula 3 below (wherein $R^1$ is a C1~C20 alkyl group) as a molecular weight controller in the presence of a catalyst.

[Chemical Formula 2]

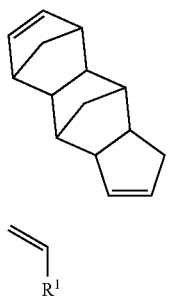

[Chemical Formula 3]

wherein $R^1$ is a C1~C20 alkyl group.

In the method according to the embodiment of the invention, the catalyst may result from activating a compound represented by Chemical Formula 4 below using an alkyllithium compound represented by $R^4Li$ (wherein $R^4$ is a C1~C20 hydrocarbyl radical) as a co-catalyst.

[Chemical Formula 4]

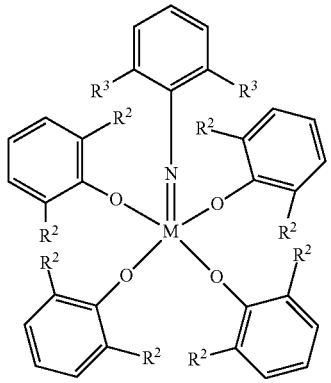

wherein M is Mo or W; $R^2$s, which are the same as or different from each other, are a hydrogen radical, C1~C20 alkyl, alkenyl or alkynyl; and $R^3$s, which are the same as or different from each other, are a hydrogen radical, C1~C20 alkyl, alkenyl or alkynyl.

According to a preferred embodiment of the invention, the compound represented by Chemical Formula 4 may be configured such that M is W, all of $R^2$s are a methyl group, and all of $R^3$s are a hydrogen radical; and $R^4$ of the alkyllithium represented by $R^4Li$ may be a butyl group.

In addition, an embodiment of the present invention provides a COP compound having a repeating unit represented by Chemical Formula 5 below.

[Chemical Formula 5]

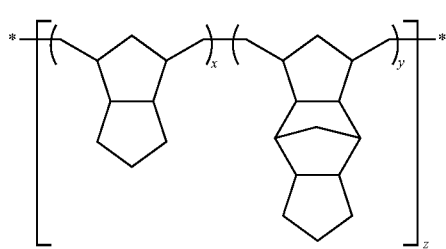

wherein a molar ratio of x:y is 99:1~1:99, and z has an average value of 10~20,000.

A preferred embodiment of the invention provides a COP compound having a repeating unit represented by Chemical Formula 5 in which the molar ratio of x:y is 90:10~50:50 and z has an average value of 10~3,000.

In addition, an embodiment of the present invention provides a method of preparing the COP compound having the repeating unit represented by Chemical Formula 5 by hydrogenating double bonds of a main chain and a ring moiety of the COP represented by Chemical Formula 1 in the presence of a compound represented by Chemical Formula 6 below as a catalyst.

$(L)_a(X)_b Ru$      [Chemical Formula 6]

In the method according to the embodiment of the invention, L is independently a neutral electron donor ligand; and X is independently an anionic ligand, and a and b are independently an integer of 1~4.

According to a preferred embodiment of the invention, the compound represented by Chemical Formula 6 may be configured such that L is bistricyclohexylphosphine or carbonyl, and X is a hydrogen radical or Cl.

In the method according to the embodiment of the invention, the catalyst for use in hydrogenation may result from activating a compound represented by Chemical Formula 7 below using a trialkylaluminum compound represented by $Al(R^5)_3$ (wherein $R^5$s which are the same as or different from each other are a halogen radical or a C1~C20 hydrocarbyl radical) as a co-catalyst.

$M(acac)_n$      [Chemical Formula 7]

wherein M is Ni or Co; acac is acetylacetonate, and n is 2 or 3.

According to a preferred embodiment of the invention, the compound represented by Chemical Formula 7 may be configured such that M is Ni and n is 2; and $R^5$ of the trialkylaluminum compound represented by $Al(R^5)_3$ is an isobutyl group.

Advantageous Effects

According to the present invention, tricyclopentadiene, which is introduced as a novel cycloolefin monomer, is subjected to ROMP together with dicyclopentadiene, thereby obtaining a COP compound having a higher glass transition temperature than polymers resulting from carrying out ROMP on dicyclopentadiene alone. The polymer of the invention is advantageous because the glass transition temperature can be modified by varying the amount of the added tricyclopentadiene unit.

BEST MODE

Figure 1:
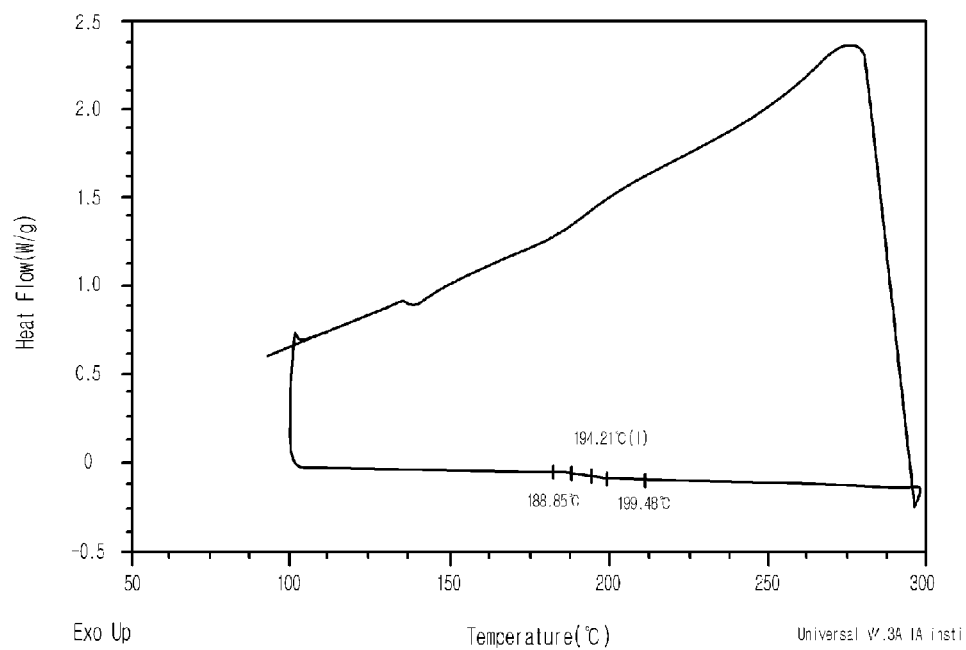
FIG. 1 illustrates DSC data before hydrogenation of a dicyclopentadiene-tricyclopentadiene polymer (DCPD: TCPD=70:30) of Example 4.

Hereinafter, the present invention will be more specifically described.

An embodiment of the present invention pertains to a COP compound having a repeating unit represented by Chemical Formula 1 below.

[Chemical Formula 1]

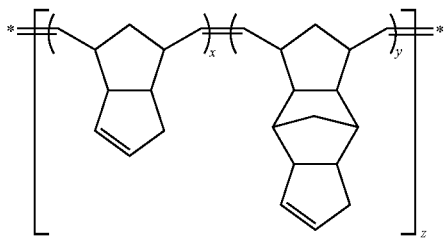

In Chemical Formula 1, a molar ratio of x:y is 99:1~1:99, and z has an average value of 10~20,000.

The COP compound having the repeating unit represented by Chemical Formula 1 may be obtained by subjecting a monomer containing a tricyclopentadiene vinyl group represented by Chemical Formula 2 below, dicyclopentadiene and a compound represented by Chemical Formula 3 below as a molecular weight controller to ROMP (Ring-Opening Metathesis Polymerization), which is schematically shown in Scheme 4 below.

[Chemical Formula 2]

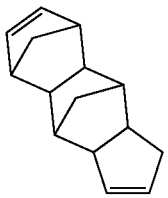

[Chemical Formula 3]

In Chemical Formula 3, $R^1$ is a C1~C20 alkyl group.

[Scheme 4]

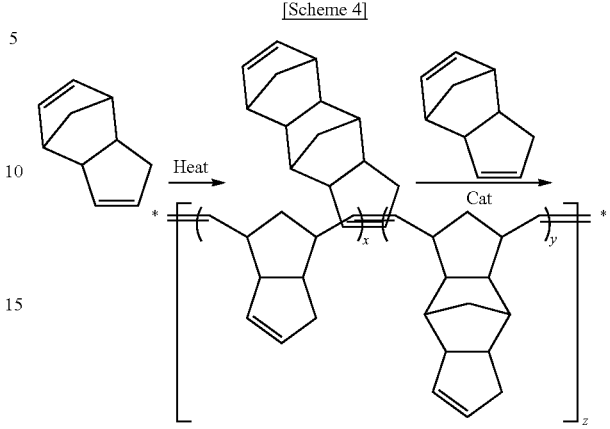

Tricyclopentadiene may be prepared by heating dicyclopentadiene so that a retro-Diels-Alder reaction takes place, thus forming cyclopentadiene, which is then subjected to an additional Diels-Alder reaction with dicyclopentadiene. Thereafter, the mixture of cyclopentadiene, dicyclopentadiene and tricyclopentadiene may be separated using vacuum distillation at different temperatures. In order to exclusively separate only a main isomer of tricyclopentadiene from the byproducts, a recrystallization method may be applied, which is performed in such a manner that the byproducts are dissolved in ethanol and then a desired material is separated using a difference in solubility at different temperatures. Such preparation and separation methods have been reported (Hyeong Cheol Park, Ahreum Kim and Bun Yeoul Lee, *Journal of Polymer Science*. Vol. 49, 938-944 (2011)).

In the present invention, tricyclopentadiene which may be obtained using the above method is polymerized with dicyclopentadiene to produce a COP, and the tricyclopentadiene monomer is bulky and is thus advantageous in terms of increasing the glass transition temperature compared to polymer compounds resulting from carrying out ROMP on only dicyclopentadiene.

The compound represented by Chemical Formula 2 may include four isomers depending on endo and exo orientation. The dicyclopentadiene compound serving as a starting material is a mixture comprising an endo-isomer and an exo-isomer at 9:1 or more, and when it undergoes Diels-Alder reaction with a norbornene-type olefin group and cyclopentadiene, endo and exo compounds may be formed. Among these compounds, only two compounds were reported to be formed at a ratio of about 5:1 with reference to *React. Kinet. Catal. Lett.* Vol. 85, 89-97 (2005) by Zhongqiang Xiong, Zhentao Mi, Xiangwen Zhang. The monomer used in the present invention is a pure tricyclopentadiene compound obtained as a pure single isomer by removing a small proportion of a compound of the mixture using recrystallization. This compound is used to precisely analyze the newly prepared polymer compound, or the isomers may be used as a mixture without being separated and thus polymers may be prepared.

According to the present invention, the COP compound having the repeating unit represented by Chemical Formula 1 may be obtained by subjecting the compound of Chemical Formula 2 and dicyclopentadiene to ROMP, in which the molar ratio of x:y of Chemical Formula 1 falls in the range of 99:1~1:99. To prepare a transparent non-crystalline resin, the molar ratio of x:y is preferably 90:10~10:90, and more preferably 90:10~50:50. The molar ratio of x:y in the polymeric chain may be controlled by adjusting the molar ratio of two monomers which are added to the reactor. The average value of z which shows the degree of polymerization may be 10~20,000, and is preferably set to 10~3,000 for the sake of ensuring appropriate mechanical strength.

In the present invention, ROMP of the compound of Chemical Formula 2 and dicyclopentadiene may be induced using a compound represented by Chemical Formula 4 below as a catalyst precursor. Concretely, the preparation method of the invention is performed in such a manner that the compound of Chemical Formula 2 and dicyclopentadiene are subjected to ROMP in the presence or absence of a solvent using a catalyst formed by activating the compound represented by Chemical Formula 4 using an alkyllithium compound represented by $R^4Li$ as a co-catalyst, yielding a COP compound according to the present invention.

[Chemical Formula 4]

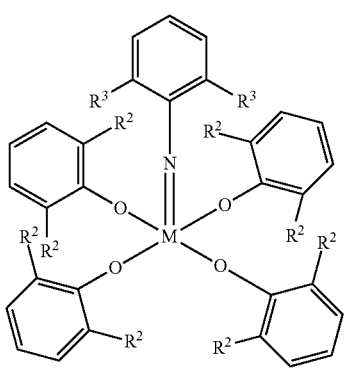

In Chemical Formula 4, M is Mo or W; $R^2$s, which are the same as or different from each other, are a hydrogen radical, C1~C20 alkyl, alkenyl or alkynyl; and $R^3$s, which are the same as or different from each other, are a hydrogen radical, C1~C20 alkyl, alkenyl or alkynyl. Preferably M is W, all of $R^2$s are a methyl group, and all of $R^3$s are a hydrogen radical; $R^4$ of $R^4Li$ is a butyl group.

The compound represented by Chemical Formula 4 may be prepared via a known method using a known compound (Shigetaka Hayano, Yoshihisa Takeyama, Yasuo Tsunogae and Ichiro Igarashi. *Macromolecules*, 2006, 39, 4663-4670).

$R^4$ of $R^4Li$ is a C1~C20 hydrocarbyl radical, which is commercially available in a large amount.

Upon performing ROMP of the cycloolefin in the presence of the catalyst, the solvent may be added or not added. As such, examples of the usable solvent may include toluene, hexane, cyclohexane, methylene chloride, chlorobenzene, etc. Particularly useful is cyclohexane.

Another embodiment of the present invention provides a COP compound having a repeating unit represented by Chemical Formula 5 below.

[Chemical Formula 5]

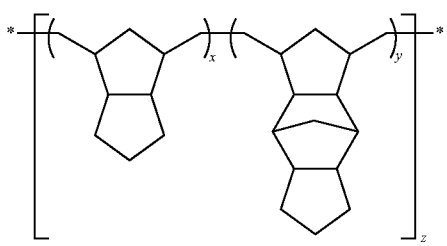

In Chemical Formula 5, a molar ratio of x:y is 99:1~1:99, and z has an average value of 10~20,000.

The COP compound having the repeating unit represented by Chemical Formula 5 is obtained by hydrogenating the polymer compound represented by Chemical Formula 1 in the presence of a catalyst.

The COP compound having the repeating unit represented by Chemical Formula 5 according to the present invention may result from hydrogenating the polymer of Chemical Formula 1. In Chemical Formula 5, the molar ratio of x:y may range from 99:1 to 1:99. In order to prepare a transparent non-crystalline resin, the molar ratio of x:y is preferably 90:10~10:90 and more preferably 90:10~50:50. The molar ratio of x:y in the polymeric chain may be controlled by adjusting the molar ratio of the two monomers which are added to the reactor. The average value of z which shows the degree of polymerization is 10~20,000, and preferably 10~3,000 for the sake of ensuring appropriate mechanical strength.

In an embodiment of the present invention, the hydrogenation of double bonds of a main chain and a ring moiety of Chemical Formula 1 may be induced using a compound represented by Chemical Formula 6 below as a catalyst precursor. Concretely, the preparation method of the invention is performed in such a manner that the hydrogenation of double bonds of a main chain and a ring moiety of Chemical Formula 1 is conducted in the presence or absence of a solvent using the compound represented by Chemical Formula 6, yielding a COP compound according to the present invention.

$(L)_a(X)_b Ru$   [Chemical Formula 6]

In Chemical Formula 6, L is independently a neutral electron donor ligand; and X is independently an anionic ligand, and a and b are independently an integer of 1~4.

Examples of the neutral electron donor ligand may include oxygen, water, carbonyl, amine, pyridine, ether, phosphine, etc. Examples of the anionic ligand may include a halogen such as F, Cl, Br and I, hydride, acetylacetonate, alkyl, aryl, etc. Preferably L is bistricyclohexylphosphine and carbonyl and X is halogen such as Cl and hydride.

The catalyst may be prepared using a known method (Janis Louie and Robert H. Grubbs, *Organometallics*, 2002, 21, 2153-2164).

In another embodiment of the present invention, the hydrogenation of double bonds of a main chain and a ring moiety of Chemical Formula 1 may be induced using a compound represented by Chemical Formula 7 below as a catalyst precursor. Concretely, the preparation method of the invention is performed in such a manner that the hydrogenation of double bonds of a main chain and a ring moiety of Chemical Formula 1 is conducted in the presence or absence of a solvent using a catalyst formed by activating the compound represented by Chemical Formula 7 using trialkylaluminum represented by $Al(R^5)_3$ as a co-catalyst, yielding a COP compound according to the present invention.

$M(acac)_n$   [Chemical Formula 7]

In Chemical Formula 7, M is Ni or Co; acac is acetylacetonate, and n is 2 or 3. Preferably useful is a compound of Chemical Formula 7 in which M is Ni and n is 2, and $R^5$ of $Al(R^5)_3$ is an isobutyl group.

The trialkylaluminum compound represented by $Al(R^5)_3$ is commercially available in a large amount, and activating the catalyst using the same is possible using a known method (U.S. Pat. No. 5,539,060 (Jul. 23, 1996)).

The COP represented by Chemical Formula 5 according to the present invention has a higher glass transition temperature than polymers obtained using ROMP of dicyclopentadiene, and the glass transition temperature may be modified by varying the amount of the added tricyclopentadiene. Thus, a COP compound having a wider range of application may be provided.

A better understanding of the present invention may be obtained through the following examples and comparative examples which are set forth to illustrate, but are not to be construed as limiting the present invention.

SYNTHESIS EXAMPLE

Synthesis and Purification of Tricyclopentadiene Compound

Dicyclopentadiene (600 g) was heated to reflux at 220° C. for 17 hr in a nitrogen atmosphere until the temperature of the solution was 184° C. Cyclopentadiene, dicyclopentadiene and tricyclopentadiene were obtained using vacuum distillation (0.05 mbar). A mixture (185 g) of cyclopentadiene and dicyclopentadiene was obtained at a temperature of not more than 70° C., and a mixture (251 g) of tricyclopentadiene isomers was obtained in the temperature range of 110~130° C. Tricyclopentadiene obtained using distillation was dissolved in hot ethanol (2.5 L), stored at −20° C., recrystallized and then filtered, thus obtaining a tricyclopentadiene solid (168 g). The obtained solid was recrystallized again in ethanol (1.7 L), yielding pure tricyclopentadiene (126 g).

Examples 1 to 6

ROMP and Hydrogenation of Dicyclopentadiene-Tricyclopentadiene (1) ROMP

In a polymerization reactor in a nitrogen atmosphere, 1-octene (0.11 g, 0.94 mmol) was added to 20 wt % of dicyclopentadiene (2.00 g, 15.12 mmol) and tricyclopentadiene (0.75 g, 3.78 mmol) in cyclohexane. The polymerization reactor was placed in a thermostat bath at 80° C. so as to reach thermal equilibrium. Subsequently, a compound represented by Chemical Formula 4 (wherein M is W, all of $R^2$s are a methyl group and all of $R^3$s are a hydrogen radical, 14.36 mg, 18.9 μmol) and butyllithium (n-BuLi) (37.8 μmol, 10.5 ml) were dissolved in 0.5 ml of toluene, thus forming an activated catalyst which was then fed into the reactor using a syringe. The reaction was carried out for 4 hr.

(2) Hydrogenation

After 4 hr, a solution of a compound represented by Chemical Formula 6 (wherein L is bistricyclohexylphosphine and carbonyl and X is halogen such as Cl and hydride, 27.5 mg, 37.8 μmol) dissolved in 6 g of cyclohexane was added into the polymerization reactor using a syringe. In order to change the atmosphere of the polymerization reactor, hydrogen gas at bar was injected. After 12 hr, hydrogen pressure was relieved and 10 ml of isopropyl alcohol was injected using a syringe. The reaction precipitate was filtered, and the polymer was washed with stirring using 40 ml of diethylether, followed by removing the solvent and then performing vacuum suction at 50° C., yielding 2.6 g of a polymer material.

As shown in Table 1 below, polymerization was carried out at the different molar ratios of dicyclopentadiene (DCPD) to tricyclopentadiene (TCPD) of 100:0 (Example 1), 90:10 (Example 2), 80:20 (Example 3), 70:30 (Example 4), 65:35 (Example 5), and 60:40 (Example 6) under conditions of the total molar number of DCPD and TCPD being fixed to 18.8 mmol, after which hydrogenation was conducted, yielding 2.1 g, 2.2 g, 2.6 g, 2.9 g, 3.0 g, and 3.0 g of polymer materials, respectively.

Figure 2:
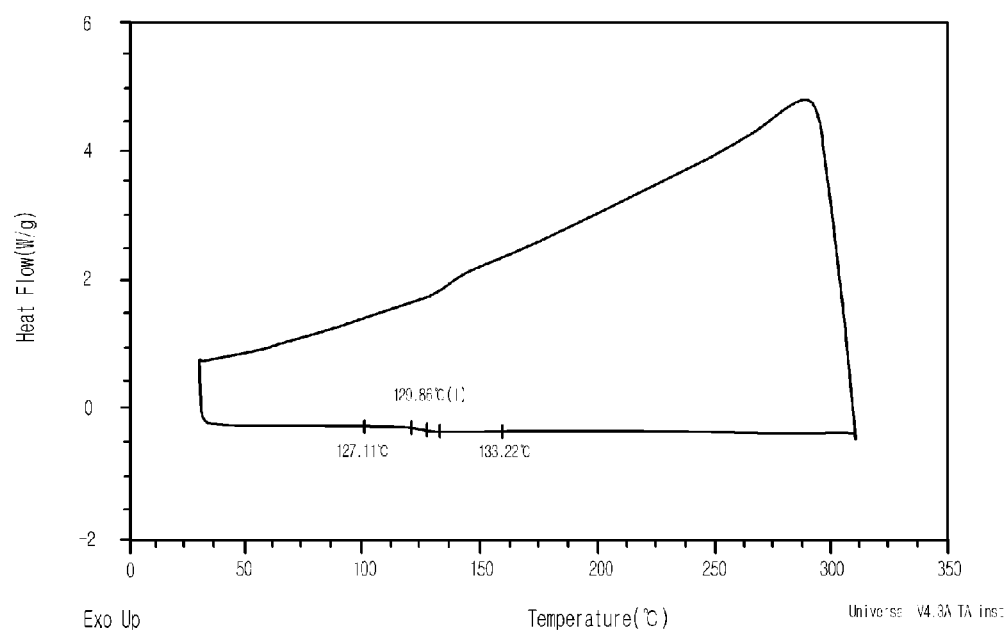
FIG. 2 illustrates DSC data after hydrogenation of a dicyclopentadiene-tricyclopentadiene polymer (DCPD: TCPD=70:30) of Example 4.

Particularly in the case of the polymer material of Example 4, the product after completion of (1) ROMP was analyzed using DSC. The results are shown in FIG. 1. Also the product after completion of (2) hydrogenation was analyzed using DSC. The results are shown in FIG. 2.

Example 7

ROMP and Hydrogenation of Dicyclopentadiene-Tricyclopentadiene (1) ROMP

ROMP here was performed in the same manner as in Example 3.

(2) Hydrogenation

Upon hydrogenation, a nickel-based catalyst was used instead of the ruthenium-based catalyst. Concretely, 4 hr after ROMP, a compound represented by Chemical Formula 7 (wherein M is Ni and n is 2, 29.13 mg, 113.4 μmol) and triisobutylaluminum (87.42 mg, 0.441 mmol) were dissolved in 9.5 g of cyclohexane thus forming an activated catalyst which was then added into the polymerization reactor using a syringe. In order to change the atmosphere of the polymerization reactor, hydrogen gas at 35 bar was injected. After 12 hr, hydrogen pressure was relieved and 10 ml of isopropyl alcohol was injected using a syringe. The reaction precipitate was filtered, and the polymer was washed with stirring using 40 ml of diethylether, followed by removing the solvent and then performing vacuum suction at 50° C., yielding 2.7 g of a polymer material.

The glass transition temperature (Tg) of the polymer materials of the above examples was measured using DSC, and the molecular weight and molecular weight distribution thereof were measured via GPC using polystyrene as a standard.

Table 1 below shows the polymerization results.

TABLE 1

| Ex. | DCPD (mol %) | TCPD (mol %) | Polymerization Time(h) | Hydrogenation Time(h) | Yield (%) | Before Hydrogenation Tg(° C.) | After Hydrogenation Tg(° C.) | Mw | PDI |
|---|---|---|---|---|---|---|---|---|---|
| 1 | 100 | 0 | 4 | 14 | 80 | 151 | 105 | 495,000 | 2.3 |
| 2 | 90 | 10 | 4 | 17 | 83 | 163 | 113 | 328,000 | 3.5 |
| 3 | 80 | 20 | 4 | 12 | 92 | 181 | 120 | 203,000 | 2.8 |
| 4 | 70 | 30 | 4 | 17 | 99 | 194 | 130 | 252,000 | 3.6 |
| 5 | 65 | 35 | 4 | 17 | 99 | 199 | 146 | 111,000 | 2.8 |
| 6 | 60 | 40 | 4 | 16 | 97 | 202 | 155 | 76,000 | 2.7 |
| 7 | 80 | 20 | 4 | 12 | 94 | 181 | 127 | 378,000 | 3.6 |

As is apparent from Table 1, in Examples 1 to 6 hydrogenation was carried out using the compound represented by Chemical Formula 6 as the catalyst, and in Example 7 hydrogenation was carried out using the compound represented by Chemical Formula 7 as the catalyst.

The results of Table 1 show that the COP compounds including tricyclopentadiene (Examples 2 to 7) have higher Tg compared to the COP compound resulting from carrying out ROMP on only dicyclopentadiene (Example 1).

It was therefore concluded that the fields in which the dicyclopentadiene-tricyclopentadiene polymer compounds according to the embodiments of the present invention would be useful covered a wider range because of the superior thermal stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cycloolefin polymer compound having a repeating unit represented by Chemical Formula 1 below:

Chemical Formula 1

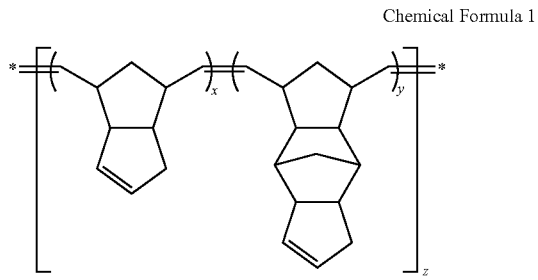

wherein a molar ratio of x:y is 99:1-1:99, and z has an average value of 10-20,000.

2. The cycloolefin polymer compound of claim 1, wherein the molar ratio of x:y is 90:10-50:50, and z has an average value of 10-3,000.

3. A method of preparing a cycloolefin polymer compound having a repeating unit represented by Chemical Formula 1 below, comprising:
subjecting a compound represented by Chemical Formula 2 below to ring-opening metathesis polymerization with dicyclopentadiene and a compound represented by Chemical Formula 3 below as a molecular weight controller in presence of a catalyst resulting from activating a compound represented by Chemical Formula 4 below using an alkyllithium compound represented by $R^4Li$ (wherein $R^4$ is a C1-C20 hydrocarbyl radical) as a co-catalyst, Chemical Formula 1

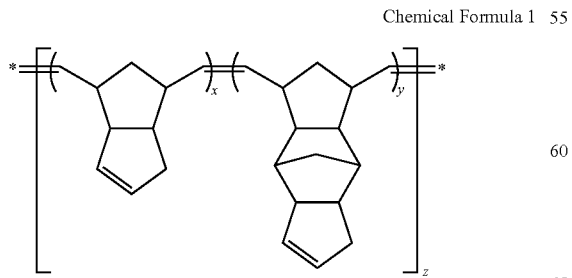

wherein a molar ratio of x:y is 99:1-1:99, and z has an average value of 10-20,000, Chemical Formula 2

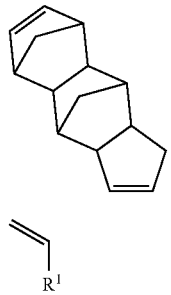

Chemical Formula 3

wherein $R^1$ is a C1~C20 alkyl group,

Chemical Formula 4

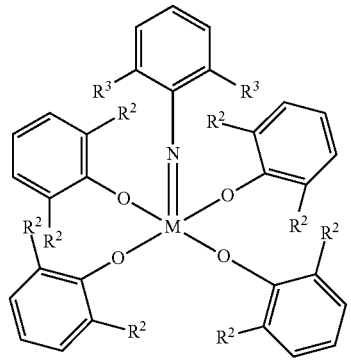

wherein M is Mo or W; $R^2$s, which are same as or different from each other, are a hydrogen radical, C1-C20 alkyl, alkenyl or alkynyl; and $R^3$s, which are same as or different from each other, are a hydrogen radical, C1-C20 alkyl, alkenyl or alkynyl.

4. The method of claim 3, wherein the compound represented by Chemical Formula 4 is configured such that M is W, all of $R^2$s are a methyl group, and all of $R^3$s are a hydrogen radical; and $R^4$ of the alkyllithium represented by $R^4Li$ is a butyl group.

5. A cycloolefin polymer compound having a repeating unit represented by Chemical Formula 5 below, Chemical Formula 5

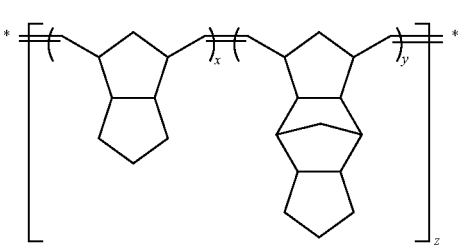

wherein a molar ratio of x:y is 99:1-1:99, and z has an average value of 10-20,000.

6. The cycloolefin polymer compound of claim 5, wherein the molar ratio of x:y is 90:10-50:50, and z has an average value of 10-3,000.

7. A method of preparing a cycloolefin polymer compound having a repeating unit represented by Chemical Formula 5 below, comprising:

hydrogenating double bonds of a main chain and a ring moiety of a cycloolefin polymer having a repeating unit represented by Chemical Formula 1 below in presence of a compound represented by Chemical Formula 6 below as a catalyst, Chemical Formula 5

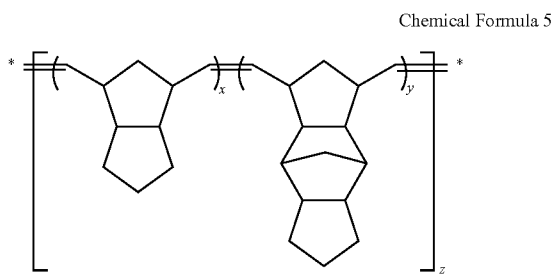

wherein a molar ratio of x:y is 99:1-1:99, and z has an average value of 10-20,000, Chemical Formula 1

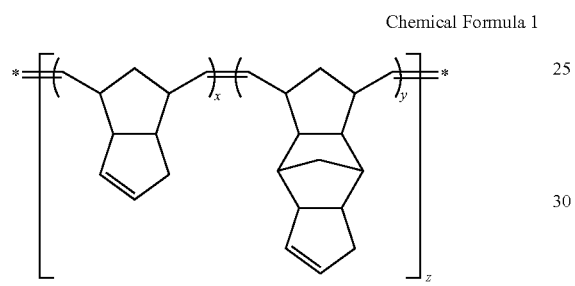

wherein a molar ratio of x:y is 99:1-1:99, and z has an average value of 10-20,000, $(L)_a(X)_b Ru$  Chemical Formula 6 wherein L is a neutral electron donor ligand selected from among oxygen, water, carbonyl, amine, pyridine, ether and phosphine; and X is an anionic ligand selected from among halogen, hydride, acetylacetonate, alkyl and aryl, and a and b are independently an integer of 1-4.

8. The method of claim 7, wherein the compound represented by Chemical Formula 6 is configured such that L is bistricyclohexylphosphine or carbonyl, and X is a hydrogen radical or Cl.

9. A method of preparing a cycloolefin polymer compound having a repeating unit represented by Chemical Formula 5 below, comprising:

hydrogenating double bonds of a main chain and a ring moiety of a cycloolefin polymer having a repeating unit represented by Chemical Formula 1 below in presence of a catalyst resulting from activating a compound represented by Chemical Formula 7 below using a compound represented by $Al(R^5)_3$ (wherein $R^5$s which are same as or different from each other are a halogen radical or a C1-C20 hydrocarbyl radical) as a co-catalyst, Chemical Formula 5

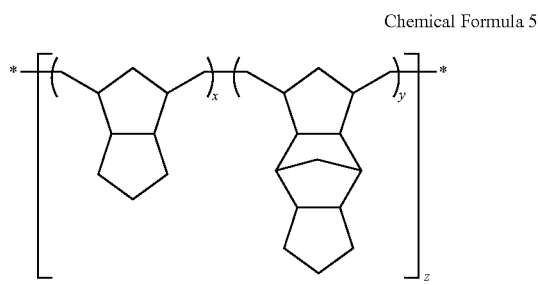

wherein a molar ratio of x:y is 99:1-1:99, and z has an average value of 10-20,000, Chemical Formula 1

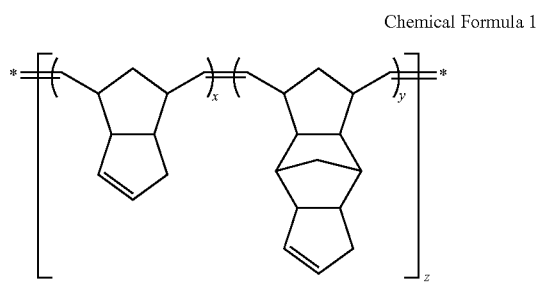

wherein a molar ratio of x:y is 99:1-1:99, and z has an average value of 10-20,000, $M(acac)_n$  Chemical Formula 7 wherein M is Ni or Co; acac is acetylacetonate, and n is 2 or 3.

10. The method of claim 9, wherein the compound represented by Chemical Formula 7 is configured such that M is Ni and n is 2; and $R^5$ of the compound represented by $Al(R^5)_3$ is an isobutyl group.

* * * * *